J. J. CARPENTER.
Hame.
No. 207,944.   Patented Sept. 10, 1878.
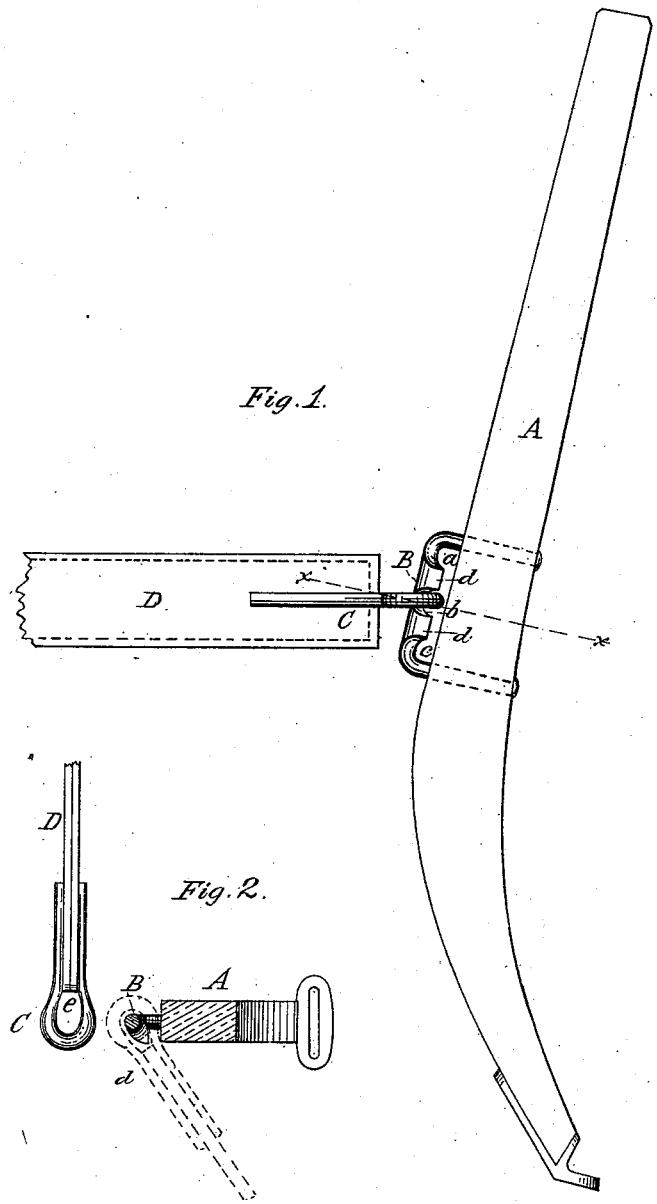

UNITED STATES PATENT OFFICE.

JASON J. CARPENTER, OF CONSTABLE, NEW YORK.

IMPROVEMENT IN HAMES.

Specification forming part of Letters Patent No. 207,944, dated September 10, 1878; application filed May 17, 1878.

*To all whom it may concern:*

Be it known that I, JASON J. CARPENTER, of Constable, Franklin county, New York, have invented certain new and useful Improvements in Hames, of which the following is a specification:

My invention relates to hames provided with staples of such form as will admit of the trace-eyes being readily adjusted in the desired position.

It consists, more especially, in providing the staples with a series of notches and projections, the latter being set diagonally and in such proximity to the side of the hame as to hold a loosely-fitting eye securely at any desired position without the aid of detachable pieces, and yet be readily adjusted at any desired height.

In the drawings, Figure 1 is a view of one-half of a hame fitted with my improved tug staple and clip. Fig. 2 is a transverse section on line $x\ x$ with the trace-eye removed.

In the drawings, A represents the hame; B, the tug-staple; C, the trace eye or clip, and D the trace. The tug-staple, as shown, is of broad or elongated form, and is provided with a series of attaching notches or sockets, $a\ b\ c$, with either of which the movable trace-eye C may be engaged, so that it may thus be connected higher or lower on the hame, to bring the point of draft or position of the traces higher or lower relatively thereto. In order to enable the trace-eye to remain in connection with whichever notch it is engaged, the staple is formed with projections $d\ d$ between the notches, which extend beyond the line of the notches and closely approach the side of the hame, forming a narrow passage along the line of the notches, as shown. This passage is too narrow to permit the thick or tugging end of the trace-eye to pass from one notch to the other, but the back part of the eye is reduced in thickness, as shown at $e$, so that when the trace-eye is turned full around in a position opposite to the working or tugging position, as shown by dotted lines in Fig. 2, the reduced part coincides with the narrow passage, and permits the eye being shifted from one notch to the other. When the eye is turned into engagement with the desired notch and the trace swung into its working position, the thick part of the eye comes into position between the projections $d$, and is thus prevented from possibly shifting out of position while in action.

I make the staple round in cross-section on all those portions that receive the strain, and with half-round notches between the projections, which make better bearings for the eye. The projections are arranged diagonally to the prongs of the staple, so that they come sufficiently near to the hame to prevent the eye slipping from one notch to the other without separate devices being attached to the staple to keep the eye in place.

I am aware that it is not new to provide a hame with a round rod furnished with pins, which act something in the same manner as the projections on my staple; but a rod furnished with pins in this manner requires that the loop sliding upon it shall accurately fit it. It is not adapted to be used with a trace-eye like mine, and it cannot readily be made of malleable cast-iron, as is usual with harness-fittings, because if cast in shape the hook cannot be put on.

I am also aware that it has been proposed to use notched staples in connection with eyes like mine; but these staples and eyes were never intended to be used in the way that mine are, as they are furnished with detachable plates to keep the eyes from slipping, which plates are to be removed when the eyes are to be changed from one notch to the other.

What I claim as new is—

The combination of the loosely-fitting eye C, constructed with reduced sections, as described, with the staple B, provided with notches $a\ b\ c$ and projections $d$, the latter being set diagonally and in such proximity to the side of the hame as to hold the eye securely at the desired height without the aid of detachable pieces, and yet allow it to slip from one notch to the other when held in proper position, substantially as described.

JASON J. CARPENTER.

Witnesses:
J. H. CARPENTER,
G. D. HASTINGS.